US006602629B1

(12) United States Patent
Guo et al.

(10) Patent No.: US 6,602,629 B1
(45) Date of Patent: Aug. 5, 2003

(54) ZERO MERCURY AIR CELL (75) Inventors: Jingdong Guo, North Olmsted, OH (US); Thomas J. O'Hara, III, Bay Village, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/577,865

(22) Filed: May 24, 2000

(51) Int. Cl.$^7$ ................................................ H01M 2/04
(52) U.S. Cl. ........................ 429/27; 429/34; 429/171; 429/175; 429/176
(58) Field of Search ................................ 429/164, 166, 429/171, 175, 176, 229, 34, 35, 27

(56) References Cited

U.S. PATENT DOCUMENTS

| | | | |
|---|---|---|---|
| 3,847,669 A | 11/1974 | Paterniti | 136/30 |
| 3,930,882 A | * 1/1976 | Ohsawa et al. | |
| 4,189,526 A | 2/1980 | Cretzmeyer et al. | 429/13 |
| 4,195,120 A | 3/1980 | Rossler et al. | 429/50 |
| 4,500,614 A | 2/1985 | Nagamine et al. | 429/206 |
| 4,592,974 A | 6/1986 | Takeda et al. | 429/229 |
| 4,606,984 A | 8/1986 | Vignaud | 429/212 |
| 4,735,876 A | 4/1988 | Miura et al. | 429/206 |
| 4,812,374 A | 3/1989 | Kagawa et al. | 429/50 |
| 4,857,424 A | 8/1989 | Larsen et al. | 429/206 |
| 4,861,688 A | 8/1989 | Miura et al. | 429/206 |
| 4,920,020 A | 4/1990 | Strauven et al. | 429/230 |
| 5,108,494 A | 4/1992 | Uemura et al. | 75/347 |
| 5,168,018 A | 12/1992 | Yoshizawa et al. | 429/190 |
| 5,206,096 A | 4/1993 | Goldstein et al. | 429/27 |
| 5,209,995 A | * 5/1993 | Tada et al. | 429/229 |
| 5,270,128 A | 12/1993 | Reichert et al. | 429/29 |
| 5,279,905 A | 1/1994 | Mansfield et al. | 429/27 |
| 5,306,580 A | 4/1994 | Mansfield et al. | 429/175 |
| 5,364,715 A | 11/1994 | Getz et al. | 429/229 |
| 5,464,709 A | * 11/1995 | Getz et al. | 429/229 |
| 5,721,065 A | 2/1998 | Collien et al. | 429/29 |

FOREIGN PATENT DOCUMENTS

| | | | |
|---|---|---|---|
| DE | 1086309 | 1/1961 | |
| EP | 0205783 | 12/1986 | ............ H01M/4/42 |
| EP | 0582293 | 2/1994 | ............ H01M/6/06 |
| FR | 2634594 | 1/1990 | ............ H01M/2/32 |
| GB | 2020478 | 7/1982 | ............ H01M/4/46 |
| GB | 2161645 | 10/1987 | ............ H01M/4/42 |
| JP | 50031327 | 3/1975 | ............ H01M/4/12 |
| JP | 50031328 | 3/1975 | ............ H01M/4/12 |
| JP | 50072135 | 6/1975 | ............ H01M/4/12 |
| JP | 53084125 | 7/1978 | ............ H01M/6/04 |
| JP | 55049858 | 4/1980 | ............ H01M/2/08 |
| JP | 55066862 | 5/1980 | ............ H01M/2/06 |
| JP | 55066863 | 5/1980 | ............ H01M/2/06 |
| JP | 55090056 | 7/1980 | |
| JP | 55090059 | 7/1980 | ............ H01M/4/06 |
| JP | 55128252 | 10/1980 | ............ H01M/2/04 |

(List continued on next page.)

OTHER PUBLICATIONS

"Overview of Alkaline Button Type Batteries". http://www.mbi.panasonic.co.jp/oembatteries/english/e_alk/out_ealk.htm.*
Linden. Handbook of Batteries, 2nd ed., pp. 10.6, 13.1–13.7. 1995 (no month).*

*Primary Examiner*—Patrick Ryan
*Assistant Examiner*—Tracy Dove
(74) *Attorney, Agent, or Firm*—Russell H. Toye, Jr.; Robert W. Welsh (57) ABSTRACT

An improved button air cell is provided that contains zero mercury, is free of indium on the sealing surface of the anode cup and has an active material comprising zinc alloyed with lead. Also provided is a method of forming a button electrochemical cell free of mercury and having no indium on the inner surface of the anode cup.

36 Claims, 2 Drawing Sheets

FOREIGN PATENT DOCUMENTS

| | | | | |
|---|---|---|---|---|
| JP | 55139758 | 10/1980 | ............ | H01M/2/08 |
| JP | 56116270 | 9/1981 | ............ | H01M/4/12 |
| JP | 57011474 | 1/1982 | ............ | H01M/6/06 |
| JP | 58155657 | 9/1983 | ............ | H01M/4/66 |
| JP | 58197675 | 11/1983 | ............ | H01M/6/06 |
| JP | 58225565 | 12/1983 | ............ | H01M/4/42 |
| JP | 60056365 | 4/1985 | ............ | H01M/4/42 |
| JP | 61061364 | 3/1986 | | |
| JP | 61096666 | 5/1986 | | |
| JP | 61101955 | 5/1986 | | |
| JP | 61143939 | 7/1986 | ............ | H01M/4/12 |
| JP | 61198555 | 9/1986 | ............ | H01M/4/42 |
| JP | 61203563 | 9/1986 | ............ | H01M/4/42 |
| JP | 61273862 | 12/1986 | ............ | H01M/4/42 |
| JP | 62123653 | 11/1987 | ............ | H01M/4/42 |
| JP | 63195956 | 8/1988 | ............ | H01M/4/06 |
| JP | 63195958 | 8/1988 | ............ | H01M/4/06 |
| JP | 63244563 | 10/1988 | ............ | H01M/4/66 |
| JP | 63274054 | 11/1988 | ............ | H01M/2/06 |
| JP | 01059769 | 3/1989 | ............ | H01M/4/64 |
| JP | 01105466 | 4/1989 | | |
| JP | 01307161 | 12/1989 | ............ | H01M/4/06 |
| JP | 03065621 | 10/1991 | ............ | H01M/4/42 |
| JP | 03230476 | 10/1991 | ............ | H01M/4/42 |
| JP | 04026061 | 1/1992 | ............ | H01M/6/06 |
| JP | 04026062 | 1/1992 | ............ | H01M/6/06 |
| JP | 04026064 | 1/1992 | ............ | H01M/6/06 |
| JP | 04026065 | 1/1992 | ............ | H01M/6/06 |
| JP | 04026066 | 1/1992 | ............ | H01M/6/06 |
| JP | 04026067 | 1/1992 | ............ | H01M/6/06 |
| JP | 06020674 | 1/1994 | ............ | H01M/6/08 |
| JP | 06203886 | 7/1994 | ............ | H01M/12/06 |
| JP | 08195229 | 7/1996 | ............ | H01M/4/06 |
| JP | 09082372 | 3/1997 | ............ | H01M/12/06 |
| JP | 10162869 | 6/1998 | ............ | H01M/12/06 |
| JP | 10208754 | 8/1998 | ............ | H01M/6/06 |
| JP | 11265715 | 9/1999 | ............ | H01M/4/42 |
| WO | 9300716 | 1/1993 | ............ | H01M/4/62 |
| WO | 9910943 | 3/1999 | ............ | H01M/4/62 |

\* cited by examiner

ZERO MERCURY AIR CELL

BACKGROUND OF THE INVENTION

The present invention relates to button-type electrochemical cells, and more particularly to button-type electrochemical cells free of added mercury.

Air electrochemical cells require a supply of oxygen to perform adequately and button air cells are used extensively in such devices as hearing aids. Typical commercial button-type alkaline electrochemical cells have a negative electrode (anode) with zinc or a zinc alloy as the active material and an alkaline electrolyte, such as potassium hydroxide. To reduce leakage, especially caused by gassing inside the cell during the electrochemical reaction, mercury has been added to the cell. Button cells on the market today employ a small amount of mercury. However, it has become apparent that mercury can be hazardous to the environment and to the health of humans and animals. Therefore, there has been an increased demand by the public and federal, state, and local governments to substantially decrease or eliminate mercury in all electrochemical cells, including button-type cells.

The elimination of mercury without making any other changes to the commercially-available button cell results in cell leakage caused by one or a combination of the following: (1) gassing, (2) capillary action of the sealing areas, (3) electrochemical creepage driven by the potential difference within the cell and (4) a cracked or delaminated hydrophobic (e.g., polytetrafluoroethylene) layer. Furthermore, pressure within button air cells can cause delamination of the hydrophobic layer from the air electrode, which creates void space, causing electrolyte to accumulate therein. This accumulation of electrolyte results in a barrier for air to reach the air electrode of the cell.

Approaches have been taken in an attempt to eliminate the leakage problem in the button-type cells, while substantially decreasing or eliminating the mercury content of the cell at the same time. Mansfield, Jr. et al. U.S. Pat. Nos. 5,306,580 and 5,279,905 disclose an air cell with an indium electroplated inner surface of a refold-type anode cup. However, it was found that although the indium reduces gassing, the indium on the inner surface of the anode cup results in an unacceptable level of salting for commercially available button air cells that employ the indium electroplating. This is a result of increased capillary action, due to the greater roughness of the indium compared to copper, even though gassing is lower on an indium vs. copper surface.

Japanese laid-open patent application 10-162869 to Toshiba Battery Company, Ltd. discloses an unamalgamated air battery having a refold type anode cup made of a triclad (nickel, stainless steel, and copper) layered composition. The anode uses a zinc powder with a specific bulk density range and electrolytic solution ratio to attempt to increase the discharge utilization rate and increase leakage resistance. The teachings of this reference alone have not been successfully applied to button cells without producing unacceptably high levels of salting.

In U.S. Pat. No. 5,168,018, Yoshizawa et al. disclose the addition of an inorganic inhibitor, such as $In(OH)_3$, and an organic surfactant, such as perfluoroalkyl polyethylene oxide, to a corrosion-resistant zinc alloy-containing anode of an alkaline cell with no added mercury to reduce hydrogen gas generation. They infer that part of the $In(OH)_3$ is electrodeposited onto the surface of the zinc alloy, raising the hydrogen overvoltage on the surface of the zinc alloy, while the remaining $In(OH)_3$ remains in the alkaline electrolyte until it is electrodeposited onto the surface of the zinc alloy that is freshly exposed during cell discharge. The surfactant forms a hydrophobic monomolecular layer on the surface of the zinc alloy to make the zinc alloy even more corrosion resistant. The teachings of Yoshizawa et al. alone have not been successfully applied to button cells without producing unacceptably high levels of leakage.

There is a need for a zero mercury, button-type electrochemical cell that is free of added mercury, highly resistant to leakage and salting, yet cost-effective to manufacture and commercialize, and provides satisfactory electrical performance.

SUMMARY OF THE INVENTION

The present invention is a button-type electrochemical cell, preferably a button air cell, comprising an anode cup having a sealing surface for contact with a gasket or seal, where the sealing surface of the anode cup has thereon no non-in situ-deposited indium, and preferably no non-in situ-deposited metal with a hydrogen overvoltage higher than that of copper. The electrochemical cell of the present invention is free of added mercury and has an anode with an active material that preferably comprises low gassing zinc. Preferably indium hydroxide is added to the anode mixture. If indium or another metal with a higher hydrogen overvoltage is put onto the interior surface of anode cups used to make cells according to the present invention, the indium or other metal is restricted to portions of the inner surface of the anode cup that are not in the seal area.

As used herein, the seal area of the anode cup is that portion of the surfaces of the anode cup that is in contact with the gasket or seal to form a seal between the anode cup and the gasket.

As used herein, in situ-deposited metal is metal that is deposited on the surface of the anode cup, as a result of contact with the anode mixture and/or electrolyte, after combining the anode cup with the anode mixture and/or electrolyte. Non-in situ-deposited metal is metal that is on the surface of the anode cup, or the material from which the anode cup is made, before the anode cup is combined with the anode mixture and/or electrolyte (e.g., as a result of cladding, coating, electrolytic plating, etc).

As used herein, an anode cup "having no non-in situ-deposited indium (or metal with a hydrogen overvoltage than that of copper) thereon" is an anode cup having no indium (or metal with a hydrogen overvoltage higher than that of copper) on its surface that was present on that surface before the anode cup was combined with the anode mixture and/or electrolyte. The surface may, however, be a metal which includes indium (or a metal with a hydrogen overvoltage greater than that of copper) as an impurity or as a minor ingredient (i.e., less than about 100 parts per million (ppm) by weight) in an alloy.

Another aspect of the present invention is the method of forming an electrochemical cell comprising the steps of: (a) forming an anode with an active material comprising zinc; (b) providing an anode cup with an inner surface, comprising an area, free of indium or any other metal with a hydrogen overvoltage higher than that of copper, for sealing against a gasket; (c) cleaning the inner surface of the anode cup; (d) providing an electrolyte, an air electrode, and a cathode can; and (e) combining the anode, air electrode, electrolyte, cleaned anode cup, and the cathode can to form a button-type air electrochemical cell. The cell that is formed is free of added mercury.

These and other features, advantages and objects of the present invention will be further understood and appreciated by those skilled in the art by reference to the following specification, claims, and appended drawings.

DETAILED DESCRIPTION OF THE PREFERRED EMBODIMENT

The electrochemical cells of this invention are preferably substantially free of mercury, that is the total amount of mercury in all of the components of the cell is such that it does not result in a harmful amount of environmental pollution when the cell is disposed of. Also, the cells of this invention are preferably free of added mercury. "Free of added mercury" means that no mercury is added to any of the cell components.

Typically, a small amount of mercury can be present in natural products. Therefore, the only mercury contained in the preferred cells of this invention is that which is naturally present in the cell components. For the preferred cells of this invention, the amount of mercury present will be less than 10 parts per million by total weight of the cell, preferably less than 5 parts per million, more preferably less than 2 parts per million, and most preferably less than 1 part per million.

The following method is used to determine the total level of mercury in the cell. It has been adapted to button air cells from the trilateral "Battery Industry Standard Analytical Method for the Determination of Mercury, Cadmium and Lead in Manganese Cells Using AAS, ICP-AES and 'Cold Vapor'", dated April 1998. This standard is available from European Portable Battery Association (EPBA), Battery Association of Japan (BAJ) and National Electrical Manufacturers Association (NEMA, USA). Twenty grams of zinc powder, 40 grams of $MnO_2$ and six grams of KOH are weighed into a two-liter beaker. Five hundred milliliters of deionized water and four hundred milliliters of $HNO_3$ are added to the beaker. Hydrogen peroxide ($H_2O_2$) is added drop-wise to the solution until no bubbling occurs upon the addition of the hydrogen peroxide. The beaker is also placed on a hot plate to aid the dissolution. The matrix solution is then transferred to a two-liter volumetric flask and diluted to volume. Six standard solutions containing 0 to 0.7 micrograms of mercury are prepared by placing 0, 50, 100, 250, 500, and 700 microliter aliquots of a 1 part per million Hg standard into six 300-ml bottles. One hundred milliliters of the matrix solution from above are added to each bottle. The cell to be analyzed is weighed and opened inside a plastic bag. For button and coin cells, a sufficient number of cells are combined to yield approximately 2.3 grams of anode. The method parameters associated with the AAA cell, described in section 8 of the method, can then be used for the collection of button or coin cells. The negative terminal with the conductor is removed and the separator paper containing the anode is also removed. The anode slurry material on the separator is scraped off into a centrifuge tube and the tube is centrifuged to separate the gellant from the zinc. The gellant portion is put into a microwave vessel and the remaining components of the cell and the zinc portion are placed into an Erlenmeyer flask. Nitric acid and water are added to the Erlenmeyer flask. Hydrogen peroxide is then added drop-wise to the sample solutions until the reaction has been completed (i.e. no bubbling upon the addition of $H_2O_2$). The sample is heated on a hot plate and allowed sufficient time for reaction and dissolution. The gellant obtained above is decomposed by a closed vessel microwave technique using $HNO_3$ and $H_2O_2$. The decomposed gellant solution is transferred into the same Erlenmeyer flask as the remaining sample. The sample solution is then mixed thoroughly and allowed to cool. The solution is then filtered and diluted to the final volume. An AAS cold vapour apparatus is set up in accordance with the manufacturer's manual. The standards are then analyzed by adding 5 milliliters 50% sulfuric acid, mixing, adding 5 milliliters 35% nitric acid, mixing, adding 1 milliliter 5% potassium permanganate solution, adding 2 milliliters hydroxylamine sulfate solution, mixing until clear, and adding 5 milliliters stannous chloride solution and immediately attaching an aeration apparatus to the bottle. The solution is allowed to stand and when the recorder pin has leveled off, the aeration apparatus is removed. A 100-ml aliquot of each sample is transferred to a 300-ml bottle and then analyzed similarly to the standards. The mercury content of the sample (in parts per million) is then calculated according to the following formula, based on total cell weight (TCW), $$\text{ppm Hg} = \frac{(a-b) \times V}{v \times TCW(g)}$$

where "a" is micrograms of mercury in the sample aliquot, "b" is the micrograms of mercury in the blank aliquot, "v" is the volume of the aliquot in milliliters taken for mercury analysis, and "V" is the total sample volume in milliliters. For button and coin cells, the aggregate weight of the cells used for the test will define TCW.

Figure 1:
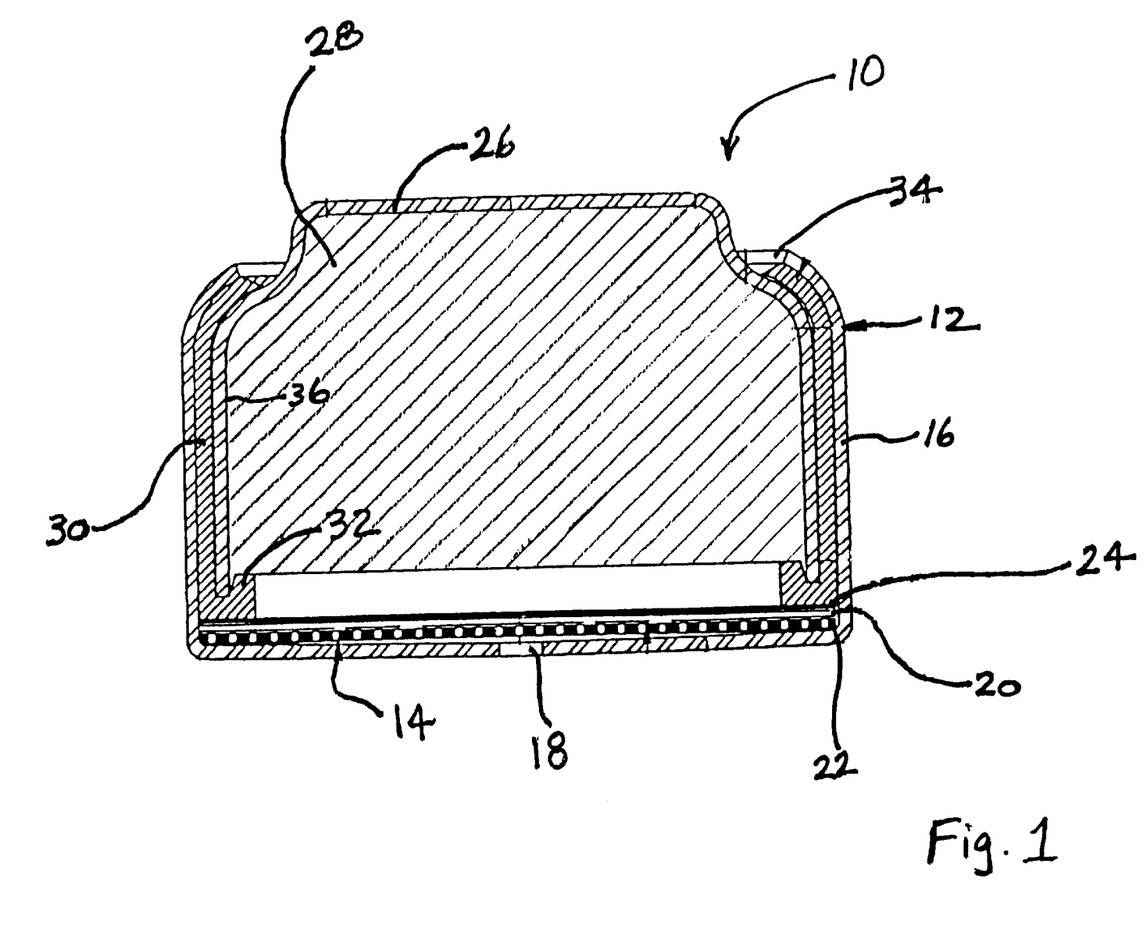
FIG. 1 is a cross-sectional view of a button-type air electrochemical cell that can employ the present invention.

FIG. 1 shows a preferred embodiment of the structure of a button air cell that can employ the present invention. The air cell 10 shown in FIG. 1 includes a cathode can 12, which is preferably formed of nickel-plated steel such that it has a relatively flat central region 14 which is continuous with and surrounded by an upstanding wall 16 of uniform height. Alternatively, the central region 14 of the can bottom may protrude outward from the peripheral part of the can bottom. At least one hole 18 is punched in the bottom of cathode can 12 to act as an air entry port.

An air electrode 20 is disposed near the bottom of the cathode can 12. The air electrode 20 may be any material suitable for use in an air electrode, but is preferably a mixture of carbon, manganese oxide ($MnO_x$), and tetrafluoroethylene (TFE). The mixture also optionally contains a surfactant often present in the TFE. Air electrode 20 also preferably has a polytetrafluoroethylene (PTFE) layer 22 laminated thereon. The PTFE layer 22 is laminated on the underside (near the bottom of the cell) of air electrode 20 as shown in FIG. 1. Air electrode 20 also preferably contains a metal screen, preferably made of nickel expanded metal, embedded therein on the opposite side of the PTFE laminated layer. The air electrode may also optionally contain a barrier membrane (not shown), such as a PTFE film, between PTFE layer 22 and flat central region 14 of the bottom of the can 12. At least one layer of separator 24 is positioned above air electrode 20. Preferably, a layer of porous material is positioned between air electrode 20 and the bottom of can 12 to evenly distribute air to electrode 20.

Cell 10 also includes a cup-shaped metal component 26, which forms the top of the cell and is generally referred to as the anode cup. The anode cup 26 is preferably made of a triclad material comprising copper that has been laminated onto the bare side of a nickel-clad steel strip. The nickel layer protects the exterior surface of the steel strip and is on the side of the anode cup that forms the exterior of the cell 10 at its top. The copper layer faces the interior of the cell 10 and therefore forms an inner surface 36 of anode cup 26. Therefore, from exterior to interior, the triclad anode cup is preferably Ni/stainless steel/Cu. Other laminated materials may be used to form the anode cup 26, including a bilaminate of copper on a stainless steel substrate or a laminate made of more than three layers. As discussed below, before assembling it with other cell components, the anode cup interior is preferably free of indium and all other metals having a hydrogen overvoltage higher than that of copper, at least at the portion of the anode cup contacting the seal. Metal having a hydrogen overvoltage higher than that of copper may be present in the seal area of the anode cup as a result of in situ deposition of those metals during or following addition of anode mixture and/or electrolyte to the anode cup. Preferably, however, no in situ-deposited metal having a hydrogen overvoltage higher than that of copper is present on the surface of the seal area of the anode cup. During manufacture of the cell, anode cup 26 is preferably inverted, and then anode mixture 28 and electrolyte are put into cup 26. Electrolyte can creep or wick along the inner surface 36 of the anode cup 26, carrying with it materials contained in anode mixture 28 and/or the electrolyte. Ions of metals (such as indium and zinc) having a hydrogen overvoltage higher than that of copper can plate onto inner surface 36 of anode cup 26 wherever the electrolyte comes in contact with cup 26.

An anodic mixture 28 is included within the interior of cell 10. The anode mixture 28 comprises a mixture of zinc, electrolyte, and organic compounds. The anode mixture 28 preferably includes zinc powder, a gelling agent such as Carbopol®, and a gassing inhibitor such as indium hydroxide (In(OH)$_3$) in amounts of about 99.7 weight percent zinc, about 0.25 weight percent Carbopol®, and about 0.045 weight percent indium hydroxide. Carbopol® is an acrylic acid polymer in the 100% acid form and is available from B.F. Goodrich.

A zinc powder according to the present invention has no mercury added to it. The preferred zinc powder is a low gassing zinc powder. Preferably the low gassing zinc powder composition produces no more than 0.5 cc of gas per 5 grams of zinc composition, and more preferably no more than 0.15 cc of gas per 5 grams of zinc composition, as determined by the following test method. Zinc powder, in an amount of 5.00±0.02 g is placed into a 50-ml volumetric flask with all but ¾" of the neck removed therefrom. The volumetric flask is filled to the brim with a potassium hydroxide solution (45% by weight KOH), and all bubbles are dislodged by tapping the flask. Ah 8-ounce plastic jar is filled approximately three-quarters full with the KOH solution and the flask is placed therein. The KOH should cover the rim of the neck of the flask. A graduated centrifuge tube is then filled with KOH solution, inverted, and sealed. The inverted centrifuge tube is immersed into the plastic jar, and unsealed. The centrifuge tube is then lowered over the volumetric flash to rest on the shoulder of the flask. Excess KOH in the jar is removed so that the liquid level is less than ¾" above the open end of the inverted centrifuge tube. A jar cover is placed over the centrifuge tube and twisted, securing the cover on to the jar. The jar is placed onto a tray, which is placed into an oven at 71° C. for 24 hours. After 24 hours, the sample is removed from the oven and given 12 sharp raps to dislodge gas bubbles. The samples are then cooled for 45 minutes. The samples are then rapped another 13 times and the volume of gas collected is read using the bottom of the meniscus of the liquid. However, before it is recorded, the volume must be corrected according to the formula:

$$V_{corr/=l} = V_{read} \times P/760 \times 298/(T+273),$$

where P is the atmospheric pressure in millimeters of mercury and T is the ambient temperature in centigrade at the moment of reading the volume.

The zinc powder preferably is a zinc alloy with about 400 to about 550 parts per million (ppm) lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and aluminum preferably total no more than 68 ppm of the zinc powder composition by weight. More preferably, the zinc powder contains no more than the following amounts of iron, cadmium, copper, tin, chromium, nickel, molybdenum, arsenic, vanadium, aluminum, and germanium, based on/the weight of zinc: Fe- 3.5 ppm, Cd- 8 ppm, Cu- 8 ppm, Sn- 5 ppm, Cr-3 ppm, Ni- 6 ppm, Mo- 0.25 ppm, As- 0. I ppm, Sb- 0.25 ppm, V- 2 ppm, Al- 3 ppm, and Ge 0.06 ppm.

The electrolyte composition is preferably a mixture of about 97 weight percent potassium hydroxide (KOH) where the potassium hydroxide is a 33% aqueous solution, about 3.00 weight percent zinc oxide (ZnO), and a very small amount of Carbowax® 550, which is a polyethylene glycol compound available from Union Carbide Corp., preferably in an amount of about 10 to 500 ppm, more preferably about 30 to 100 ppm, based on the weight of zinc composition in the anode.

Cell 10 also includes a tubular shaped gasket 30 made from an elastomeric material which serves as the seal. The bottom edge of the gasket 30 has been formed to create an inwardly facing lip 32, which abuts the rim of anode cup 26. Optionally, a sealant may be applied to the sealing surface of the gasket, can and/or anode cup. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene.

The cathode can 12, including the inserted air electrode 20 and associated membranes is inverted and pressed against the anode cup/gasket assembly, which is preassembled with the cup inverted so the rim of the cup faces upward. While inverted, the edge of the cathode can 12 is deformed inwardly, so the rim 34 of the cathode can 12 is compressed against the elastomeric gasket 30, which is between the cathode can 12 and he anode cup 26, thereby forming a seal and an electrical barrier between the anode cup and the cathode can 12. Any suitable method may be used to deform the edge of the can inward to seal the cell, including crimping, colleting, swaging, redrawing, and combinations thereof. Preferably the cell is sealed by crimping or collating with a segmented die so that the cell can be easily removed from the die while a better seal is produced.

As used herein, a segmented die is a die whose forming surfaces comprise segments that may be spread apart to enlarge the opening into/from which the cell being closed is inserted and removed. Preferably portions of the segments are joined or held together so they are not free floating, in order to prevent individual segments from moving independently and either damaging the cell or interfering with its insertion or removal. Preferred crimping mechanisms and processes are disclosed in commonly owned U.S. Application No. 09/495,528, filed Jan. 31, 2000, which is hereby incorporated by reference.

A suitable tab (not shown) can be placed over the opening 18 until the cell is ready for use to keep air from entering the cell before use.

Figure 2:
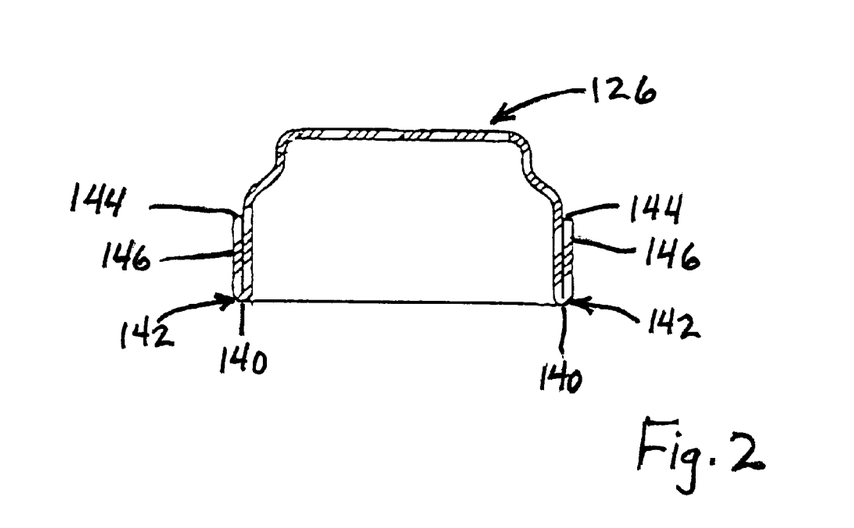
FIG. 2 is a cross-sectional view of an anode cup for a button-type air electrochemical cell having a refold.
Figure 3:
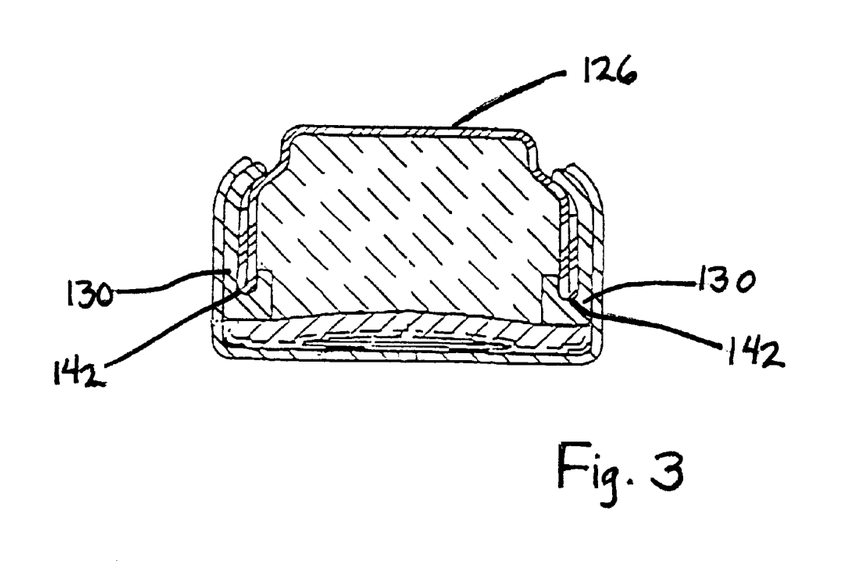
FIG. 3 is a cross-sectional view of a button-type air electrochemical cell employing a refold-type anode cup.

In the preferred embodiment and as shown in FIG. 1, the button-type air electrochemical cell of the present invention includes a straight-walled anode cup 26, that is, it has no refold. A straight-walled anode cup can offer several advantages over a refold anode cup (see FIG. 2) with respect to minimizing leakage. The sharp rim of a straight-walled cup can more effectively penetrate into the surface of the gasket than the more rounded rim 140 of a refold cup 126 when pressure is applied during cell closing, producing a tighter fit and making it more difficult for electrolyte to get through the interface. Because there can be less compression of the gasket 130 between the can and the cup in the area just above the terminal edge of the outer portion 144 of the "U" 142 in the refold portion 146 of the wall of the cup, electrolyte that reaches this point can more easily travel the remaining distance to reach the outside of the cell (see FIG. 3). However, it is contemplated that the present invention can be incorporated into cells having an anode cup with the refold feature. As used herein, a "straight-walled anode cup" is an anode cup whose cut terminal edge defines the opening in the cup, and a "refold" 146 is a portion of the wall of the anode cup that is folded back upon itself in a U-shaped configuration so that the opening in the cup is defined by the bottom of the "U" 142.

The inner surface 36 of the anode cup 26 is free of indium and preferably free of all metals having a hydrogen overvoltage higher than that of copper, at least where it contacts the gasket 30 (FIG. 1). The inner surface 36 is also cleaned sufficiently to remove contaminants, such as lubricants, which can cause gassing, to reduce leakage from the cell. The preferred method of cleaning the inner surface 36 of the anode cup 26 is by vapor degreasing, although it is contemplated that other methods of cleaning the interior surface of the anode cup may be used, as long as the surface is cleaned sufficiently to reduce leakage of the cell. It is believed that the cleaning, in addition to improved crimping methods for sealing the cathode can top reduces the salting tendency of the cell, even when no mercury is added.

Furthermore, the air cell of the present invention has reduced salting. Salting is a form of leakage in which the amount of material escaping from the cell is small, and the rate is slow, allowing liquid to evaporate as the material escapes so there is generally not a wet appearance. The same things that cause leakage can cause salting. Salting is particularly critical for miniature cells, whose cell containers are not concealed by jackets. Customers' and consumers' standards with respect to salting are quite high. In addition to directly affecting sales, the presence of salt can adversely affect contact resistance and can lead to corrosion of the exterior of the cells. Additionally, when a cell salts, electrolyte is lost, reducing the cells discharge capacity. Salting, for purposes of this invention, is defined as crystals of electrolyte salt visible at 20× magnification or less, that are present at either the can-gasket or cup-gasket interface. Comparative testing was performed using comparative cells and cells of the present invention. The compositions of those cells are shown in Table 1.

TABLE 1

| Cell Component/ Feature | Comparative Cells | Cells of Invention |
|---|---|---|
| Zinc Composition | | |
| Hg | 3 ± 0.5 wt % | Unamalgamated |
| ZnO | 0.5 wt % max. | 0.5 wt % max. |
| Pb | 400 to 550 ppm | 400 to 550 ppm |
| Fe | 20 ppm max. | 3.5 ppm max. |
| In | 200 ± 20 ppm | |
| Cd | 10 ppm max. | 8 ppm |
| Cu | 10 ppm max. | 8 ppm |
| Cr | 5 ppm max. | 3 ppm |
| Ni | 10 ppm max. | 6 ppm |
| Mo | 1 ppm max. | 0.25 ppm |
| Sb | 1 ppm max. | 0.25 ppm |
| Th | 2 ppm max. | |
| Sn | 10 ppm max. | 5 ppm |
| As | 1 ppm max. | 0.1 ppm |
| V | 2 ppm max. | 2 ppm |
| Al | | 3 ppm |
| Ge | | 0.06 ppm |
| Zinc gassing | | 0.15 cc/ 5 g Zn composition max. |
| Anode composition: | | |
| Zn/electrolyte weight ratio: | 3.4 to 3.7 | 3.5 to 3.8 |
| Carbopol | 0.25 wt % of anode | 0.25 wt % of anode |
| In(OH)$_3$ | 0 | 0.045 wt % of anode |
| Electrolyte composition: | | |
| 33 wt % aqueous KOH | 100 wt % | 97 wt % |
| ZnO | 0 | 3 wt % |
| Carbowax | 0 | 0.1 mg/g of Zn |

There were no significant differences between the cells compared in Tables 2, 3, and 5 with respect to the air electrode, anode cup, the method of closing the cells, or any other material unless specifically noted below.

Table 2 shows the results of salting tests performed on four different types of air cells, comparing the comparative cells with the cells employing the present invention, as described in Table 1, using a conventional one-piece crimp die.

TABLE 2

| Test | | AC675 | AC13 | AC312 | AC10 |
|---|---|---|---|---|---|
| Temp. | Time | (PR44) | (PR48) | (PR41) | (PR70) |
| 21° C. | 1 year | −100% | −70% | −41% | −85% |

Table 2 shows the average improvement in salting (negative numbers indicate less salting) for cells made according to a preferred embodiment of the present invention compared to conventional cells, based on three lots of 100 cells each for each cell type. After one year at 21° C., cells with no added mercury unexpectedly and surprisingly had less salt than conventional cells with 3% mercury. Similar results were observed when 3 lots of 50 cells each were tested at 71° C. Testing at this very high temperature is an accelerated test, intended to stress the cells, so problems can be identified in a relatively short time. After both four weeks and eight weeks at 71° C., the amount of salting observed on the cells of the invention was generally less than that observed on the conventional cells. In those few instances where salting after storage at 71° C. was greater for cells of the invention, the magnitude of the difference was small. This testing at both 21° C. and 71° C. demonstrates that salting and leakage levels for cells of the invention are at least as low as, if not lower than, commercially available cells containing added mercury. The cells tested at 71° C. were closed with a three-piece segmented crimp die.

Cells with no mercury added that were closed with a segmented crimp die had superior salting performance at 71° C. compared to cells made in the same way but closed with a conventional one-piece crimp die. These results are shown in Table 3.

TABLE 3

| Time at 71° C. | AC675 (PR44) | AC13 (PR48) | AC312 (PR41) | AC10 (PR70) |
|---|---|---|---|---|
| 4 weeks | −100% | −68% | −97% | −74% |
| 8 weeks | −88% | −62% | −97% | −70% |

The values in Table 3 represent the percent improvement in salting (negative numbers indicate less salting) for cells with no added mercury that were closed with a segmented crimp die rather than a conventional solid crimp die, based on at least two lots of 50 cells each.

Discharge capacities were also compared between conventional cells and cells employing the present invention, as described above, except that a segmented crimp die was used to close all cells. For each cell type, both an application test and a rating test were run, as defined in Table 4.

TABLE 4

| Cell Type | Application Test | Rating Test |
|---|---|---|
| AC675 (PR44) | 1000 ohms, 16 hours/day, to 0.9 V | 625 ohms, 16 hours/day, to 0.9 V |
| AC13 (PR48) | 1000 ohms, 16 hours/day, to 0.9 V | 1500 ohms, 16 hours/day, to 0.9 V |
| AC312 (PR41) | 1000 ohms, 16 hours/day, to 0.9 V | 1500 ohms, 16 hours/day, to 0.9 V |
| AC10 (PR70) | 6000 ohms, 16 hours/day, to 0.9 V | 3000 ohms, 16 hours/day, to 0.9 V |

All discharge capacity tests were run at 21° C. and 50% relative humidity. The percent improvement in discharge capacity for the cells of the present invention compared to conventional cells containing 3% added mercury is summarized in Table 5.

TABLE 5

| Test | Storage Time/Temp. | AC675 (PR44) | AC13 (PR48) | AC312 (PR41) | AC10 (PR70) |
|---|---|---|---|---|---|
| Application | Fresh | +2.3% | +2.4% | +5.4% | +6.7% |
| Rating | Fresh | +2.3% | +3.2% | +6.0% | +5.5% |
| Rating | 20 days at 60° C. | +5.8% | +4.6% | +10.7% | +8.8% |
| Rating | 60 days at 60° C. | +7.6% | +7.3% | +14.5% | +17.7% |

An improvement of about 3% in fresh discharge capacity is expected since the cell capacity is limited by the amount of active material in the anode, and in the cells according to the present invention there is more space for active material when mercury is removed. As shown in Table 5, for the AC 312 and AC 10 cell types, the capacities for these cells for fresh discharge are about double the amount expected. This is a surprising and unexpected result. Even more surprising and unexpected is the fact that the capacity improvement, as shown in Table 5, in all cell types is even greater after high temperature storage. In the past, mercury has been used to provide better shelf-life and the results, as shown in Table 5 when mercury is removed, are unexpected.

The air cell of the present invention provides acceptable leakage rates for commercialization, very low salting, and increased discharge capacity when compared to similar cells containing mercury. Thus, the present invention provides a product that is commercially friendly due to the absence of mercury and a product that can be commercialized due to its low leakage tendency and low salting tendency, while maintaining very good service.

The above description is considered that of the preferred embodiment only. Modifications of the invention will occur to those skilled in the art and to those who make or use the invention. Therefore, it is understood that the embodiment shown above is merely for illustrative purposes and not intended to limit the scope of the invention, which is defined by the following claims as interpreted according to the principles of patent law, including the doctrine of equivalents.

The invention claimed is:

1. A button electrochemical cell comprising:
    an anode having an active material comprising a low gassing zinc composition; and
    an anode cup having a sealing surface for contact with a seal and an anode contacting surface for contact with said anode, said sealing surface of said anode cup having thereon no non-in situ-deposited metal with a hydrogen overvoltage higher than that of copper, and said anode contacting surface having thereon a layer of non-in situ-deposited metal with a hydrogen overvoltage higher than that of copper;
    wherein said zinc composition produces 0.5 cc or less gas per 5 grams of zinc composition when tested for 24 hours at 71° C. in aqueous solution of 45 weight percent KOH and the electrochemical cell is free of added mercury.

2. The electrochemical cell defined in claim 1 wherein said anode cup is straight-walled.

3. The electrochemical cell defined in claim 1 wherein said anode cup has been cleaned by vapor degreasing.

4. The electrochemical cell defined in claim 1 wherein the cell is an air cell.

5. The electrochemical cell defined in claim 1 wherein said zinc composition produces 0.15 cc or less gas per 5 grams of zinc composition when tested for 24 hours at 71° C. in aqueous solution of 45 weight percent KOH.

6. The electrochemical cell defined in claim 5 wherein said zinc is alloyed with lead.

7. The electrochemical cell defined in claim 6 said lead is present in an amount of 400 to 550 ppm by weight relative to said zinc.

8. The electrochemical cell defined in claim 1 wherein a sealant is disposed between said seal and said anode cup sealing surface.

9. The button electrochemical cell defined in claim 1 further comprising:
    an anode mixture having an active material comprising zinc powder and having indium hydroxide ($In(OH)_3$) therein; and
    an electrolyte mixed with a polyethylene glycol compound,
    the electrochemical cell being free of added mercury.

10. The button electrochemical cell defined in claim 9 wherein said polyethylene glycol compound is added in an amount of 10 ppm to 500 ppm based on the weight of zinc in said anode.

11. The button electrochemical cell defined in claim 9 wherein said inner surface is cleaned.

12. The button electrochemical cell defined in claim 9 wherein said zinc powder produces 0.5 cc or less gas per 5 grams of zinc powder when tested for 24 hours at 71° C. in aqueous solution of 45 weight percent KOH.

13. The button electrochemical cell defined in claim 12 wherein said zinc powder produces 0.15 cc or less gas per 5 grams of zinc powder when tested for 24 hours at 71° C. in aqueous solution of 45 weight percent KOH.

14. The button electrochemical cell defined in claim 13 wherein said zinc powder is alloyed with lead in an amount of about 400 ppm to about 550 ppm by weight relative to said zinc powder.

15. The button electrochemical cell defined in claim 9 wherein said anode cup is a straight-walled anode cup.

16. The button electrochemical cell defined in claim 9 wherein the cell is an air cell.

17. A button electrochemical cell comprising:
an anode cup having a sealing surface for contact with a seal and an anode contacting surface for contact with an anode, said sealing surface of said anode cup having thereon no non-in situ-deposited metal with a hydrogen overvoltage higher than that of copper, and said anode contacting surface having thereon a layer of non-in situ-deposited metal with a hydrogen overvoltage higher than that of copper; and
an electrolyte having a polyethylene glycol compound therein,
the electrochemical cell being free of added mercury.

18. The button electrochemical cell defined in claim 17 wherein said sealing surface of said anode cup has been cleaned by vapor degreasing.

19. The button electrochemical cell defined in claim 17 wherein the cell is an air cell and said anode cup is straight-walled.

20. The button electrochemical cell defined in claim 17 and further comprising an anode having an active material comprising a zinc composition.

21. The button electrochemical cell defined in claim 20 wherein said zinc composition produces 0.5 cc or less gas per 5 grams of zinc composition after 24 hours at 71° C. in aqueous solution of 45 weight percent KOH.

22. The button electrochemical cell defined in claim 21 wherein said zinc composition produces 0.15 cc or less gas per 5 grams of zinc composition after 24 hours at 71° C. in aqueous solution of 45 weight percent KOH.

23. The button electrochemical cell defined in claim 20 wherein said polyethylene glycol compound is present in said electrolyte in an amount of 10 ppm to 500 ppm based on the weight of zinc in said anode.

24. A mercury-free button electrochemical cell comprising:
a straight-walled anode cup having a sealing surface for contact with a seal and an anode contacting surface for contact with an anode, said sealing surface of said anode cup having thereon no non-in situ-deposited metal with a hydrogen overvoltage higher than that of copper, and said anode contacting surface having thereon a layer of non-in situ-deposited metal with a hydrogen overvoltage higher than that of copper; and
an electrolyte having zinc oxide (ZnO) therein,
the electrochemical cell being free of added mercury.

25. A mercury free button electrochemical cell comprising:
a straight-walled anode cup having a sealing surface for contact with a seal and an anode contacting surface for contact with an anode, said sealing surface of said anode cup having thereon no non-in situ-deposited metal with a hydrogen overvoltage higher than that of copper, and said anode contacting surface having thereon a layer of non-in situ-deposited metal with a hydrogen overvoltage higher than that of copper;
an anode comprising a zinc composition that produces 0.5 cc or less gas per 5 grams of zinc composition when tested for 24 hours at 71° C. in aqueous solution of 45 weight percent KOR, lead alloyed with said zinc in an amount of 400–550 ppm relative to said zinc composition and indium hydroxide (In(OH)3) mixed therewith; and
an electrolyte having a polyethylene glycol compound mixed therewith, and zinc oxide (ZnO) mixed therewith;
the electrochemical cell being free of added mercury.

26. A mercury-free button air electrochemical cell made by the method comprising the steps of:
(a) forming an anode comprised of indium hydroxide ((OH)$_3$) and an active material comprised of a low gassing zinc composition, which zinc composition will produce 0. 15 cc or less gas per 5 grams of zinc composition when tested for 24 hours at 71° C. in an aqueous solution of 45 weight percent KOH;
(b) providing an anode cup with an inner surface comprised of copper, said inner surface comprising a sealing surface for contact with a seal and an anode contacting surface for contacting said anode, the sealing surface having thereon no metal with a hydrogen overvoltage greater than that of copper, and the anode contacting surface having thereon a metal with a hydrogen overvoltage higher than that of copper;
(c) cleaning said inner surface of said anode cup by vapor degreasing;
(d) providing an alkaline electrolyte with zinc oxide and a polyethylene glycol compound therein, an air electrode, and a cathode can;
(e) combining said anode, said air electrode, said alkaline electrolyte including said polyethylene glycol compound, said cleaned anode cup and said cathode can, to form a mercury-free air electrochemical cell; and
(f) sealing the cell using a segmented die.

27. The electrochemical cell defined in claim 7, wherein said zinc contains a total of no more than 68 ppm by weight of chromium, iron, molybdenum, arsenic, antimony, vanadium, cadmium, copper, nickel, tin and aluminum, and wherein said zinc further contains no more than 25 ppm by weight of chromium, iron, molybdenum, arsenic, antimony and vanadium.

28. The electrochemical cell defined in claim 27, wherein said zinc contains no more than 3.5 ppm of iron, 8 ppm of cadmium, 8 ppm of copper, 5 ppm of tin, 3 ppm of chromium, 6 ppm of nickel, 0.25 ppm of molybdenum, 0.1 ppm or arsenic, 0.25 ppm of antimony, 2 ppm of vanadium, 3 ppm of aluminum and 0.06 ppm of germanium, based on the weight of the zinc.

29. The electrochemical cell defined in claim 27, wherein:
(a) said anode further comprises $In(OH)_3$;
(b) said cell further comprises an electrolyte solution, the electrolyte solution comprising KOH, ZnO and a polyethylene glycol compound; and
(c) said polyethylene glycol compound is present in the cell in an amount between 10 ppm and 500 ppm, based on the weight of said zinc.

30. The electrochemical cell defined in claim 5 wherein said cell further comprises an alkaline electrolyte comprising aqueous potassium hydroxide, zinc oxide, and a polyethylene glycol compound, and said anode further comprises indium hydroxide.

31. The electrochemical cell defined in claim 30 wherein said cell is a button air cell, said anode cup has an inner surface capable of contacting said anode, and the inner surface of the anode cup comprises a layer of copper.

32. A button electrochemical cell comprising a cathode, an anode mixture comprising an unamalgamated zinc alloy and an aqueous alkaline electrolyte, and a housing comprising a cathode can, an anode cup, and a seal; wherein:
said anode cup comprises a sealing surface for contact with said seal and an anode contacting surface for contact with said anode mixture;
said anode cup sealing surface has thereon no non-in situ-deposited metal with a hydrogen overvoltage higher than that of copper; and
said anode cup anode contacting surface has thereon a layer of non-in situ-deposited metal with a hydrogen overvoltage higher than that of copper.

33. The electrochemical cell as defined in claim 32, wherein said cell comprises an aqueous KOH electrolyte.

34. The electrochemical cell as defined in claim 33, wherein said layer of metal is a layer comprising indium metal.

35. The electrochemical cell as defined in claim 33, wherein said layer of metal is disposed over a layer of copper.

36. The electrochemical cell as defined in claim 33, wherein said anode mixture further comprises:
a low-gassing zinc composition that produces 0.5 cc or less gas per 5 grams of zinc composition after 24 hours when tested for 24 hours at 71° C. in an aqueous solution of 45 weight percent KOH;
$In(OH)_3$;
an organic surfactant; and
ZnO.

* * * * *

UNITED STATES PATENT AND TRADEMARK OFFICE
CERTIFICATE OF CORRECTION

PATENT NO. : 6,602,629 B1 Page 1 of 1
APPLICATION NO. : 09/577865
DATED : August 5, 2003
INVENTOR(S) : Jingdong Guo and Thomas J. O'Hara, III It is certified that error appears in the above-identified patent and that said Letters Patent is hereby corrected as shown below:

Column 12,
Line 16, change "K0R" to -- K0H --.
Line 18, change "(In(0H)3)" to -- (In(0H)$_3$) --.
Line 27, change "((0H)$_3$)" to -- (In(0H)$_3$) --.

Signed and Sealed this

Eleventh Day of July, 2006

JON W. DUDAS
*Director of the United States Patent and Trademark Office*